Patented Sept. 14, 1954

2,689,202

UNITED STATES PATENT OFFICE 2,689,202

PROCESS OF GRINDING FROZEN VITAMIN A MATERIAL

Abraham Bavley and Charles J. Knuth, Brooklyn, Wilbur A. Lazier, Kew Gardens, and Albert E. Timreck, New York, N. Y., assignors to Chas. Pfizer & Co., Inc., Brooklyn, N. Y., a corporation of Delaware No Drawing. Application December 11, 1951, Serial No. 261,144

4 Claims. (Cl. 167—81)

This invention is concerned with improved vitamin products and especially with the preparation of fat-soluble vitamins in granular form.

Certain vitamin dosage forms are known in which oil-soluble vitamins, particularly oils containing vitamin A, are dispersed throughout the matrix of a water-soluble, gelable colloid. Some of these materials are described in the United States Patents Nos. 2,183,053, 2,183,084, and 2,218,592. A notable type is vitamin beadlets, small globules of gelatin or other colloid having the desired vitamin dispersed therein. Many difficulties are encountered in preparing these gel products, however. Loss of the vitamin in inert oils and losses in washing the product with solvents frequently occur. The need for special handling of the unusual beadlet form is also an important factor.

A novel process has now been found whereby the usual methods of forming vitaminaceous gel products are considerably simplified and improved and products of high quality are prepared with greatly decreased losses of the active vitamins. Broadly speaking, this new process involves preliminary preparation of dried films or sheets containing one or more fat-soluble vitamins dispersed in a gelled colloid and comminution of these films to small particles under certain conditions which minimize product losses and loss of vitamin activity. According to this process, the chosen oil-soluble vitamin is dispersed throughout a solution of a water-soluble, gelable colloid by any desired means, and the dispersion is cast into the form of sheets or continuous films and dried. The dried material is then frozen and physically subdivided or ground, while frozen, in a non-thawing, inert atmosphere. Immediate immersion of the ground material may then be effected in a suitable cold (non-thawing) organic solvent, wherein excess water, impurities, etc. are removed. The particles are recovered from this washing step and dried. The final products are stable, highly potent, easily handled vitaminaceous granules containing a very high proportion of the vitamin originally present in the gelled sheets.

According to certain specific and preferred embodiments of this invention, fat-soluble vitamin, which may be in the form of an oil of moderate or high potency or as a crystalline compound, such as crystalline vitamin A acetate, is dispersed in tiny droplets throughout a warm aqueous solution of a gelable colloid. Gum acacia, pectin, tragacanth and the like are suitable for this purpose, and gelatin is particularly useful. Relative proportions of the various constituents of these dispersions and general methods for preparing the same are set forth in the aforementioned U. S. patents and in a copending application Serial No. 226,736, filed May 16, 1951, by Goett et al., now Patent No. 2,643,209. It is preferred to add a sugar material like glucose, molasses, corn syrup or honey to assist in plasticizing the dried colloid. If crystalline vitamin A acetate is used, it is desirable to heat the mixture above the melting point of the ester, in order to disperse it well throughout the aqueous phase.

An especially useful and remarkably successful method of effecting thorough dispersion of the vitamin in the gel is to subject the mixture to homogenization. It has been found that this homogenization of the vitamin-colloid dispersion before drying results in the formation of extremely fine particles. There are certain distinct advantages to products containing the resulting very minute particles of the vitamin. There is an unexpected increase in stability. It might have been thought that the smaller particles would be more prone to oxidation because of possible larger surface exposed to the air, but this is surprisingly not true. The vitamin in the final granules also seems to be present in more readily assimilable form in the mammalian digestive system. In the washing operation after freeze-grinding, there is definitely even less extraction of the active vitamin from the product when the homogenization step has previously been used, although one might have expected that the finer the particles, the more easily they would be dissolved by the solvent.

The warm aqueous dispersion, once prepared by these various means, is poured into trays or onto an endless belt of suitable construction, so that sheets or continuous films are formed. It is preferred to obtain sheets about ¼ of an inch or less in thickness. The sheets are chilled and then allowed to dry under atmospheric conditions or the drying may be accelerated by exposure to elevated temperatures and low humidity. One good procedure is to pour the vitamin mixture onto a rotating cold drum, so that the colloid will gel rapidly and then to remove the film from the drum and further dry it.

After the sheeting has been dried, that is, after its moisture content has reached such a level that the surface is dry to the touch and the material is rather brittle, the film may be cut up into smaller particles. Chips or shavings of about one to two inches in diameter are especially satisfactory.

The key to the success of the present invention is the peculiar feature of freeze-grinding the gelled and dried material. Ordinary milling allows loss of oily components by air oxidation, decomposition or mechanical removal. The product is gummy at normal temperatures, clogging mills or screens and other machinery, wherein the material often becomes overheated and the vitamin content loses potency. The new freeze-grinding obviates these problems.

The step of freezing the gelled and dried sheets or chips should obviously be carried out by means of a cooling agent that will not appreciably dissolve the components of the gel composition. It has been found most convenient and efficient to break up large sheets of gel into smaller shavings or chips as aforesaid, and then simply to add Dry Ice (solid carbon dioxide) directly thereto. Good contact is achieved by using relatively small particles of Dry Ice, i. e. so that a large surface area is presented, and agitating the mixture. Temperatures of between —10° and —70° C. are desirable, and about —30° C. is often preferred. The chips are readily frozen and the entire mass, the vitamin product as well as the Dry Ice, is fed into a suitable precooled grinding or pulverizing mill to obtain the desired screen size. Alternatively, the material may be ground in liquid nitrogen. Hammer mills, pulverizers, cold-operated roller mills and many other types of mechanical grinding apparatus known in the engineering field can be employed, and the comminuted particles can then be classified as to size in conventional equipment if desired. Granules of 30–200 mesh (U. S. screen size) are thus readily prepared. The atmosphere during grinding should be inert, as aforesaid. That is, it should comprise a gas which is non-reactive with the vitaminaceous material, e. g. carbon dioxide, nitrogen, helium, etc. During milling the product shows no tendency to clog screens or otherwise hamper operations, as it does in grinding at normal room conditions.

The comminuted product is fed from the grinder to a reservoir containing the chosen cold solvent. This washing agent may also be cooled merely by the direct addition of Dry Ice, although any other desired means may be used; a temperature of about —50° C. is particularly effective. The solvent should, of course, not materially dissolve the gelled products nor react therewith, but aside from these restrictions many varied organic compounds are useful. Lower alcohols, such as ethanol or isopropanol, ethers, lower ketones like acetone, etc. may all serve to rinse off any vitamin that may occur on the surface of the particles and to remove residual water and other contaminants from the granules.

The finely subdivided material is removed from the wash and dried, generally and most easily at room temperature and under vacuum, to remove small amounts of solvent adhering thereto. The product obtained consists of high potency, uniformly small-sized, stable vitamin-containing granules, and a minimum of loss of the valuable vitamins is encountered. Small amounts may be contained in the solvent wash, but these are readily recovered. In fact, using crystalline vitamin A acetate as an example, this compound may be directly recovered from the solvent by simple concentration in an inert atmosphere under vacuum. On the other hand, if milling is attempted under ordinary conditions using a similar product prepared from crystalline vitamin A acetate, it is most difficult or impossible to recover crystalline material from a solvent wash. The fact that the vitamin can now be recovered in crystalline form indicates the unexpected value of the new process and how little decomposition occurs during the course of it.

The following examples are given by way of illustration and are not intended as limitations of this invention. Indeed, as many apparently widely different embodiments of the present invention may be made without departing from the spirit and scope hereof, it is to be understood that the invention is only limited as defined in the appended claims.

*Example I*

A solution of 160 grams of pharmaceutical-grade gelatin and 128 grams of corn syrup in 260 ml. of water was prepared. The mixture was stirred and heated at 65° C. until dissolution was complete, then 68 grams of crystalline vitamin A acetate was added to the stirred mixture. After stirring rapidly for 10 minutes at 65° C. the vitamin emulsion was poured on to an aluminum tray of such a size that a uniform film about ¼ to ⅛ inch in thickness was formed. A small amount of a silicone oil lubricant was first applied to the tray to assist in preventing sticking. After several hours the mixture had gelled. It was allowed to dry for 24 hours in a warm room and the resulting quite brittle sheet was cut into one-inch squares. These small squares or chips were allowed to dry for an additional 36 hours. The dried chips were then placed in a cylindrical vessel, about 100 grams of Dry Ice were added, and the mixture was agitated until the fragments of vitaminaceous gel were completely frozen, as evidenced by a high degree of brittleness. A conventional comminuting mill was precooled to about —20 to —30° C. by the addition of Dry Ice and the frozen chips, mixed with Dry Ice, placed therein and ground to a particle size averaging between 20 and 100 mesh (U. S. screen size). The fine particles were fed directly from the mill into a vessel containing a mixture of isopropanol and Dry Ice (temperature about —50° C.). After all of the milled material had been thus collected, the product was filtered from the isopropanol and dried at room temperature. The potency of the resulting material was 497,000 units of vitamin A per gram. It was a fine, light yellow granular material, excellently suited for incorporation in food stuffs or in vitamin preparations, such as multi-vitamin capsules or tablets. The filtered isopropanol was concentrated under vacuum in an inert atmosphere and crystalline vitamin A acetate was recovered. Over 95% of the vitamin A acetate originally introduced was accounted for either in the granular dry product or in the recovered crystalline vitamin A acetate.

*Example II*

An aqueous vitamin A-containing dispersion like that of Example I was prepared and passed through a two stage homogenizer (Gaulin-dairy type) run at 900–1500 p. s. i. in the first stage and at 300–500 p. s. i. in the second stage. The resulting emulsion was cast onto an endless stainless steel belt to form a continuous sheet of gelled material. After drying, this sheet was chipped off into smaller sections, further dried 24 hours at about 35° C. and then freeze-milled like the sheets of Example I. Ethanol cooled to —40° C. was utilized as the washing agent, and highly potent, yellow granules of vitamin A product were finally obtained.

What is claimed is:

1. A process which comprises dispersing vitamin A in a solution of a water-soluble, gelable colloid, casting the dispersion into the form of a gelled sheet and drying the same, freezing the dried sheet, and comminuting the sheet while frozen, in an inert atmosphere.

2. The process of claim 1 wherein the comminuted product is washed, while still frozen, in a water-miscible organic solvent maintained at a temperature below the thawing point of said product, and the washed vitaminaceous granules are recovered from said wash and dried.

3. The process of claim 1 wherein the colloid is gelatin.

4. A process which comprises dispersing vitamin A in an aqueous solution of a water-soluble, gelable colloid, homogenizing the dispersion, casting the homogenized fluid into the form of a gelled sheet and drying the same, subdividing the dried sheet into chips, freezing the chips by mixing them with solid carbon dioxide, grinding the frozen chips in an inert atmosphere in contact with solid carbon dioxide, washing the ground product in a water-miscible organic solvent maintained at a temperature of about $-50°$ C., and recovering the washed vitaminaceous granules.

References Cited in the file of this patent

UNITED STATES PATENTS

| Number | Name | Date |
| --- | --- | --- |
| 2,183,084 | Reynolds | Dec. 12, 1939 |
| 2,206,113 | Nitardy | July 2, 1940 |
| 2,218,592 | Taylor | Oct. 22, 1940 |
| 2,290,120 | Thomas | July 14, 1942 |
| 2,380,418 | Dombrow | July 31, 1945 |
| 2,410,110 | Taylor | Oct. 29, 1946 |